Dec. 13, 1938. P. KOLLSMAN Re. 20,948

QUICK READING ALTIMETER

Original Filed Dec. 10, 1931 4 Sheets-Sheet 1

INVENTOR
PAUL KOLLSMAN
BY Ronald Day
ATTORNEY

Dec. 13, 1938. P. KOLLSMAN Re. 20,948

QUICK READING ALTIMETER

Original Filed Dec. 10, 1931 4 Sheets-Sheet 2

INVENTOR
PAUL KOLLSMAN
BY
ATTORNEY

Dec. 13, 1938. P. KOLLSMAN Re. 20,948

QUICK READING ALTIMETER

Original Filed Dec. 10, 1931 4 Sheets-Sheet 3

INVENTOR
PAUL KOLLSMAN
BY
ATTORNEY

Dec. 13, 1938. P. KOLLSMAN Re. 20,948

QUICK READING ALTIMETER

Original Filed Dec. 10, 1931 4 Sheets-Sheet 4

INVENTOR
PAUL KOLLSMAN
BY Leonard Day
ATTORNEY

Reissued Dec. 13, 1938

Re. 20,948

UNITED STATES PATENT OFFICE 20,948

QUICK READING ALTIMETER

Paul Kollsman, New York, N. Y.

Original No. 1,857,311, dated May 10, 1932, Serial No. 580,119, December 10, 1931. Reissue application October 27, 1932, Serial No. 639,897. Divided and this application for reissue January 8, 1934, Serial No. 705,642

1 Claim. (Cl. 73—4)

Figure 1:
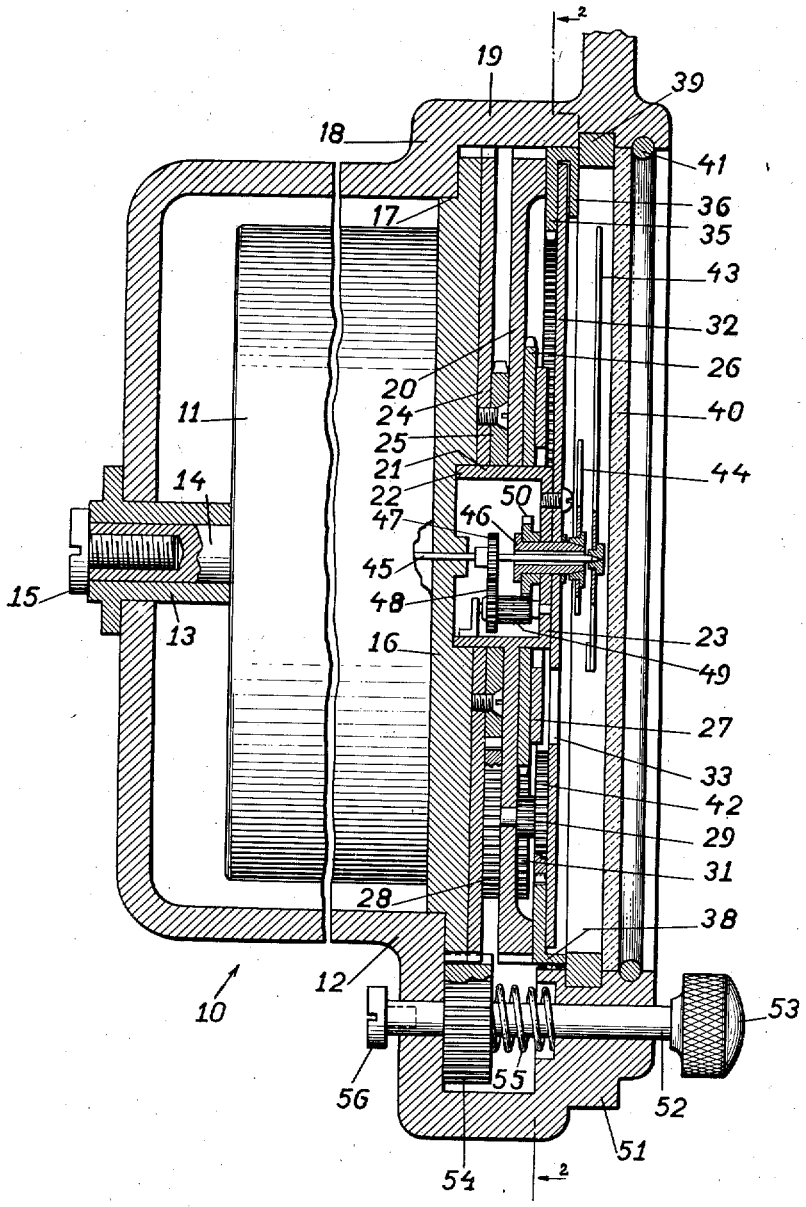

This application is a division of my copending application Serial No. 639,897, for the reissue of my Patent No. 1,857,311, said application having been filed on October 27, 1932.

This invention relates to indicators and more particularly to aneroid altimeters. A quicker and more dependable understanding of the objects of the invention will be had by referring first superficially to the structure by reference character. The outer stationary casing 12 is a housing for mounting the whole altimeter in an instrument panel. Any well-known type of aneroid or barometric pressure responsive mechanism included in the aneroid means 11 operatively connects with and rotates the spindle 45 of large pointer 43 in response to changes in barometric pressure. Spindle 45 passes freely through the front plate 16 of the aneroid means 11 into the interior of its enclosing sub-casing. This front plate 16 is made fast to the sub-casing of the aneroid means 11 and is in the form of a gear by which the aneroid means is rotatedly adjustable relatively to the stationary casing 12 by a setting means.

The parts visible through the glass 40 broadly speaking are indicating means or elements. In this broad class are included pointer means, pointer elements or pointers such as the pointers 43 and 44, which preferably constitute all of the indicating means which is moved by the power of the aneroid means. Also included under the broad definition "indicating means" are the dial means or scale means such as the dial 32. Likewise broadly included under the term "indicating means" are the reference means, reference elements, or reference marker such as the reference elements 36, and 27, although the reference element 27 is shown in the form of a rotatable member bearing a series of indicating reference numbers.

Setting means manually operable by the knurled knob 53 functions to effect relative setting movements or adjustments involving some or all of the indicating means and, if desired, the aneroid means. This setting movement, effected by the setting means, is in contradistinction to the operative movements of the pointer means by the aneroid mechanism of aneroid means 11—altitude responsive means.

This specification most particularly relates to features which make possible the rapid reading of an indication regardless of whether the indication to be read is in response to the actuation of an aneroid means usually employed in connection with altimeters, or to actuating means usual for tachometers, or to indicators for stress, flow, air speed, and the like. More particularly, the object of the invention is to provide for the instantaneous reading in the decimal system without calculation of any kind and through the medium of at least two dissimilar pointers.

A further particular object of the invention is to simplify and speed up the reading of an indicating instrument over a wide range. To this end I provide a dial having a single scale divided uniformly from one to ten, cooperating with two unlike pointers concentric with the said scale and operating in response to the aneroid means in proportion to changes in barometric pressure in the ratio of one to ten, with their zero positions corresponding to the zero on the single scale. By this arrangement, in carrying out this object of my invention, the complete rotation of one pointer may represent a thousand foot change in altitude, which is indicated by the other pointer by one major division on the scale.

A large pointer may be a high speed pointer and a shorter pointer a low speed pointer. If the short pointer indicates somewhere between "2" and "3" on the single scale, and the long pointer indicates "5", a glance at the pointers on the single scale instantly indicates 2500 feet without any cooperative calculation. This indicating means instantly indicates altitude in strict accordance with the decimal system with all the accuracy of a sensitive pointer and all the necessary range of a slow motion pointer.

A further object of the invention is to provide suitable interconnecting gearing and setting means for setting such pointers having a ten to one ratio to accord with the setting of a reference element, preferably to any indication throughout the entire practical range of flying, and so as to accord with my heretofore mentioned object of causing the sum of setting changes to equal zero.

The above and further objects of the invention will be particularized more fully in the following claim, which is directed to illustrative embodiments of the invention described in the following specification in connection with the accompanying drawings for purposes of illustration and not limitation.

Figure 2:
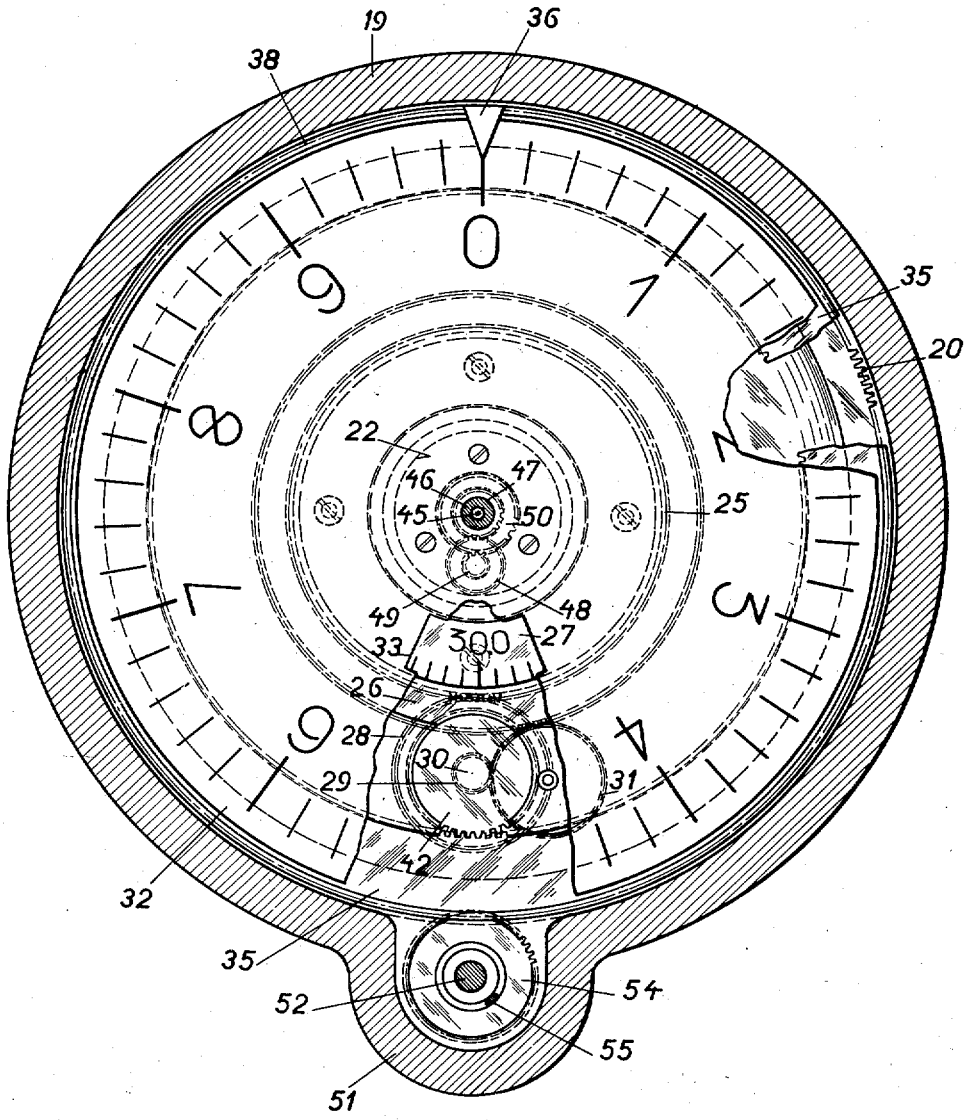
Figure 4:
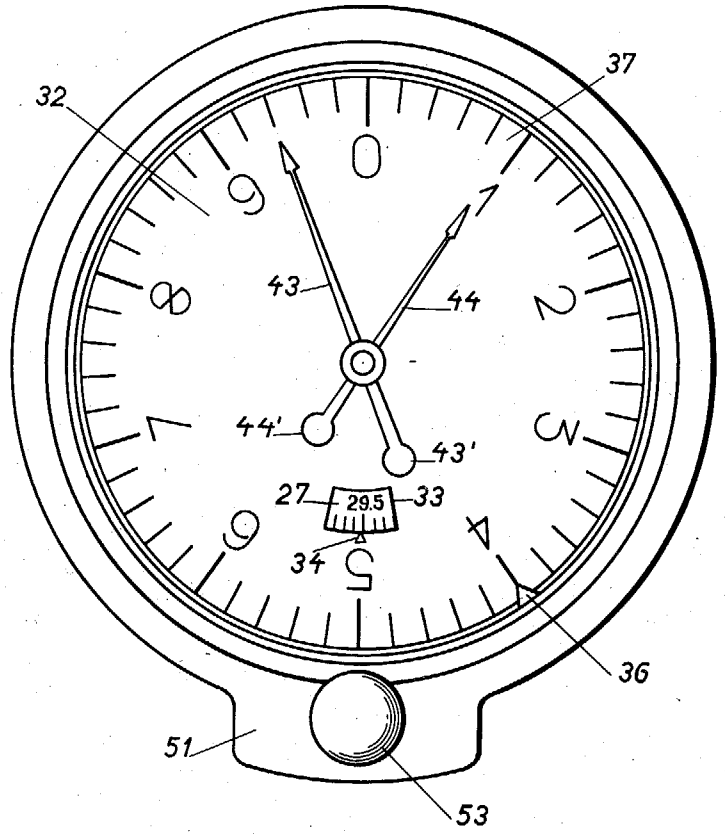
Figure 3:
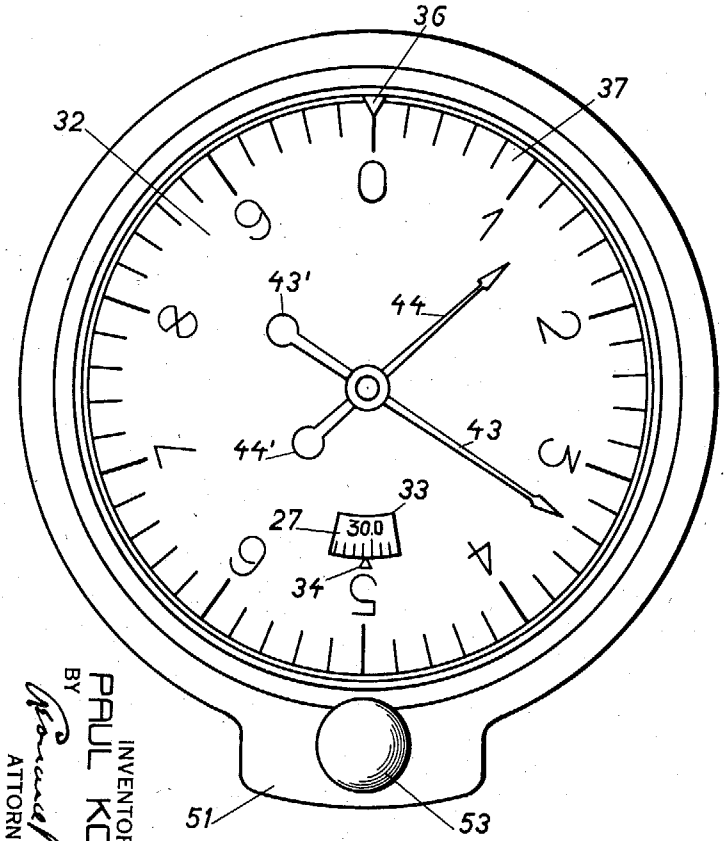
Figure 6:
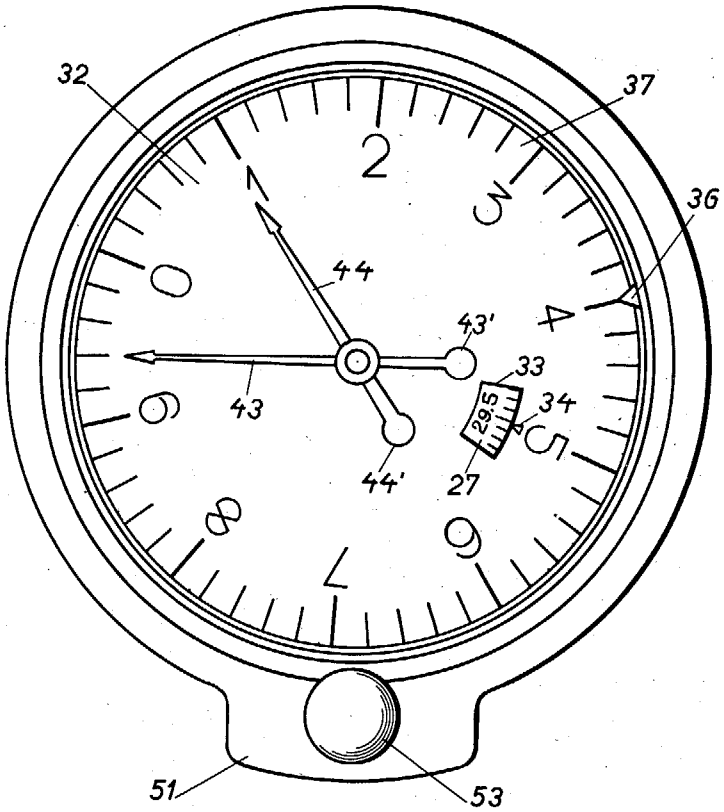
Figure 5:
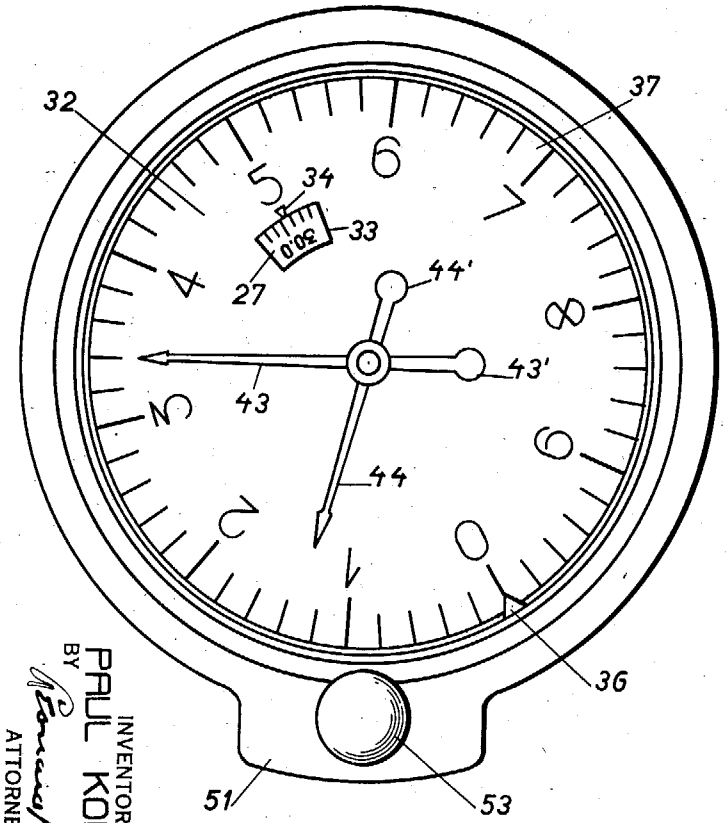

In the drawings Fig. 1 is an enlarged vertical section through the altimeter at right angles to its normal position on the instrument board, with part broken away at the locality of the aneroid means; Fig. 2 is a section at right angles to the section of Fig. 1 through the plane of line 2—2; Fig. 3 is a front elevation of the altimeter with one embodiment for the indicating means indicating the elevation of 1340 feet relatively to sea level; Fig. 4 is a view similar to Fig. 3 of the same instrument set for landing on a landing field with an altitude of 400 feet; Fig. 5 is a view similar to Fig. 3 of the same instrument and with the same setting, but with the indicating means rotated for level flight in accordance with one object of the invention; and Fig. 6 is a front elevation of the altimeter of my invention with the indicating means set for level flight at 940 feet net and subsequent landing upon a landing field with the elevation of 400 feet above sea level.

The embodiment of the indicator shown is an altimeter 10 of the type actuated by an atmospheric pressure sensitive means, shown in the form of any approved aneroid means 11, the entire mechanism of which is preferably housed within a cylindrical shell or subcasing mounted preferably concentrically within the stationary casing 12 adapted to be fixedly mounted in the instrument panel in the position indicated in the figures.

Broadly speaking, such aneroid means provides a yielding element operated by a varying force.

The entire aneroid means is shown mounted for manual adjustable rotation. A hub 13, suitably fixed to and axially of the stationary casing 12, journals a stub shaft 14 fixed to the subcasing of the aneroid means 11, and is shown retained by a screw 15. The front of the aneroid means is closed by a front plate 16 fixed thereto and shown in the form of a gear. This gear 16 has a circular recess 17 affording rotary bearing engagement on an angular portion 18 of housing 12. By reason of this angular formation 18 an annular enlargement 19 is afforded for receiving the toothed part of the gear 16 and other parts presently to be described.

Associated with and in front of the gear 16 is a gear 20, which is shown to be concentric with and of equal diameter with the gear 16 and, under certain conditions, may be rotatable relatively thereto. This gear 20 may be mounted in a suitable manner. It is formed integral with a hub 22 bearing in the circular recess 21 formed concentrically with the gear 16. The cylindrical hub 22 has a front wall or closure 23, serving as a mount for other parts presently to be described.

Journaled externally on the cylindrical hub 22 is a gear 24 in front of the gear 16 and between it and the gear 20, but spaced apart therefrom a sufficient amount to accommodate the gear 25 of smaller diameter and made fast thereto in any suitable manner, as by screws. This gear 25 is of smaller diameter than gears 16, 20, and 24 and is determined by a gear ratio presently to be described.

Also journaled on the exterior of cylindrical hub 22, but on the front side of gear 20, is a gear 26 of smaller diameter. This gear 26 functions to carry a reference means such as the ring shaped numeral bearing rotary member 27. The rotary reference member 27 bears numerals in graduated order indicating barometric pressures as they rotate into visibility through window 33. The reference member 27 may rotate freely 360° or more and its rotation is not limited by any stops.

Interconnecting the gears 25 and 26 is a gear train including pinions 28 and 29, both fixed to the same stub shaft 30 concentric therewith and thereby journaled in a perforation through gear 20. These gears 28 and 29 are positioned on opposite sides of gear 20 (28 in the rear thereof and 29 in front thereof). The pinion 28 engages gear 25 and pinion 29 may engage a gear 31, journaled on the web of gear 20 and gear 31 is shown in turn engaging the gear 26, whereby various relative rotations may be caused to take place, in accordance with any one of various manual manipulations of a setting means presently to be described.

A dial 32 is fixed relatively to gear 20 by being mounted fixedly to the front closure 23 of hub 22. This dial 32 has a window 33, through which various reference elements or marks such as numbers indicating various barometric pressures in inches of mercury and fractions thereof may be observed. By reason of the fact that the rotatable member of cylindrical or ring-shaped dial 27 is capable of a complete rotation, relatively generous spacing may be employed, even though the entire range of barometric pressure, throughout which range it may be desired to make a reference setting, is employed and numerically designated on this rotatable member 27.

It should be noted that none of the gears 16, 24, 20, nor 35, about to be described, are operated by the aneroid means 11. They are operable solely in response to the manual manipulation of the setting means and, as indicated particularly in Figs. 1 and 2, rest in the annular enlargement 19 of the stationary casing 12 in frictional engagement therewith, which frictional engagement is at their extreme periphery, the mass of the parts tending to hold them in fixed position relatively to the fixed casing 12 until and unless they are manually adjusted by the setting means presently to be described.

For rotating the gear 35 carrying the reference marker 36 a pinion 42 may be secured on the shaft 30 in addition to the gears 28 and 29, already having been described as carried by the same shaft 30. This shaft 30 and pinions 28, 29, and 42 rotate as a unit when operated in any one of the ways presently to be described. Pinion 42 operatively engages internal gear 35.

In its complete and preferred embodiment, the altimeter has as its pointer means, a long pointer 43 and a short pointer 44, which are relatively rotatable in predetermined different degrees by the aneroid means 11, which operates through any well known connecting mechanism to rotate the spindle 45 equal angular amounts in proportion to equal changes in feet altitude. The spindle 45 extends freely through the front plate or gear 16 and through the hollow shaft or rotatable hub 46, journaled in an opening in wall 23 and dial 32 for Figs. 1, 2, 3, 4, 5, and 6.

The long or sensitive pointer 43 is secured on spindle 45, and the short or range pointer 44 is carried by the hollow shaft 46. Interconnecting shafts 45 and 46 is a planetary gear train. A gear or pinion 47 is fast to the spindle 45 and meshes with gear 48. Pinion 49 is fixed to the same shaft as is gear 48, which shaft is journaled to the cylindrical hub 22, 23, which is integral with the gear 20. Pinion 49 meshes with gear 50 fixed to the hollow shaft 46 and serving to drive the range pointer 44 at any desired ratio relatively to pointer 43, preferably at the angular speed ratio of one to ten. At this point it should be noted that it is the rotatability of the cylindrical hub 22, 23 which mounts the shaft of gear and pinion 48 and 49 which constitutes the sun and planet relation in this gearing, the advantage of which will later be described.

The manually operable setting means is mounted in an extension 51 of the circular casing enlargement 19. A shaft 52 slidably extends from front to rear through this enlargement 51 and has fixed thereto a pinion 54 which, together with the shaft 52, is urged rearwardly by the compression spring 55, preferably seated in a pocket. A removable set screw 56 secured in the rear end of shaft 52 serves as a removable locking means limiting the setting operation of the pinion 54. By suitable manipulations of the setting means, various combinations of the gears 16, 24, and 20 may be operated by means of the pinion 54. With the safety locking screw 56 in place, only two combinations may be operated. With the parts positioned as shown in Figs. 1 and 2, a simple rotation of the knob 53 drives both gears 16 and 24, while gear 20 is held stationary relatively to the casing 12 in any suitable manner, as by its frictional engagement therewith. This is setting combination or Position No. 1.

With the apparatus as shown in Fig. 1, by pulling out on the knob 53 and turning it, pinion 54 is caused to engage all three gears 16, 24, and 20, to effect a simultaneous rotation of said three gears. This is combination or Position No. 2.

If the safety locking screw 56 is removed, and the knob 53 is pulled forward slightly farther than for position No. 2, pinion 54 may be caused to engage solely gears 24 and 20, whereupon a rotation of the knob 53 rotates said gears 24 and 20, while gear 16 is held stationary relatively to casing 12, as by its frictional engagement therewith. This is combination or Position No. 3.

If the knob 53 is pulled still farther forward, pinion 54 will be caused to mesh solely with gear 20, whereupon a rotation of knob 53 rotates gear 20, gears 16 and 24 being held stationary in any suitable manner, as by reason of their frictional engagement with the stationary casing 12. This is combination or Position No. 4.

*Operation*

With the parts in the position shown in Fig. 1, a rotation of shaft 52 and its pinion 54 clockwise as shown in Fig. 2, a manual setting of the altimeter may be effected with reference to a particular condition, such as the foot altitude of a landing field, the barometric pressure at a landing field, the foot altitude desired for level flight, or the barometric pressure corresponding to desired level flight. In making this manual setting (position No. 1), the pointers 43 and 44 and the reference element 36, all three relatively to the scale means upon which they read, are caused to change thier indications so that the sum of the changes is equal to zero and therefore equal to a constant. Likewise a relative change between the numerical barometric pressure indications of the rotatable reference element 27 is to be made so that the sum of its change plus the change of the pointer means is also equal to a constant and to zero in the same unit of measure.

By reason of the fact that the rotary members 27 and 26 are not limited in their rotation but are free to rotate a complete rotation of 360° and more, substantially no limits are imposed upon the gear train including gears 25, 28, 29, 31 and 26, which gear train determines the angular rate of rotation for the member 27 relatively to other rotary parts such as the fast pointer 43 and the slow pointer 44. From the drawings it may be determined approximately what this relative angular rate of rotation is. The gear ratio between gears 29 and 31 is shown to be approximately 5 to 1 while the ratio of gear 25 to gear 26 through their interconnecting gears 28 and 31 is approximately 8 to 7. The complete gear train therefore gives an angular speed to the rotary member 27 relatively to gear 25 and gear 24 of 7 to 40. The rate of rotation of fast pointer 43 is unity or one. As previously described the rate of rotation of slow pointer 44 is one-tenth. Therefore, in the showing of the drawings rotary member 27 rotates slower than the fast pointer 43 and faster than the slow pointer 44, seven-fortieths being less than one and more than one-tenth.

*Position No. 1*

Fig. 3 shows a position of the indicating means indicating an altitude of 1340 feet, which is indicated by the pointers 43 and 44 on scale 37 relatively to zero altitude or sea level, as indicated by reference marker 36 positioned at zero, while the barometric pressure element 27 indicates 30.0 as the nearest corresponding number for normal sea level barometric pressure. Assume that it is now desired to set the altimeter for landing upon a landing field with the elevation 400 feet. By telephone communication with the landing field, the foot altitude of the landing field, 400 feet, may be obtained or the corresponding barometric pressure, 29.5, may be obtained.

If the foot altitude is obtained, a clockwise rotation of knob 53, as viewed in Figs. 3, 4, and 5, serves to move the reference marker to indicate 400 feet, as shown in Fig. 4. The gearing intergearing rotatable reference element 27 causes this element to indicate the barometric pressure 29.5 corresponding to 400 feet. In like manner, if the barometric pressure of the landing field and not its foot altitude is obtained, the same clockwise rotation of knob 53 is imparted until the barometric pressure 29.5 is indicated through window 33, whereupon the corresponding foot altitude will be indicated by the reference marker 36 upon the scale 37.

Now, at the same time that these reference elements 36 and 27 are being set to correspond with the landing field condition, the pointer means is moved counterclockwise or in a negative manner to subtract 400 feet altitude from its indication in Fig. 3, so that in Fig. 4 it correctly indicates 940 feet, the distance above the landing field, so that the pointer means will indicate zero when the level of the landing field is reached.

It is thus clear that the sum of the negative change of the pointer means relatively to its scale 37 and the positive change of the reference means 36 relatively to the same scale 37 is numerically zero, and therefore equal to a constant. In like manner, by altering the barometric pressure change from the showing that corresponded to sea level to that corresponding to the atmospheric pressure at the landing field into feet altitude, again the changes are equal to zero.

*Position No. 2*

It may be desired to continue flying at level flight at the altitude of 1340 feet. To facilitate this, with the parts in position No. 2, a rotation is imparted to knob 53, with the indicating means indicating as shown in Fig. 3 until the sensitive pointer 43 is horizontal, as shown in Fig. 5. No change in the altitude indication or reference means takes place, but the sensitive pointer 43 is horizontal so that any increase in altitude from level flight is indicated by a movement above horizontal of pointer 43 and any change below level flight is indicated by a movement of pointer 43 below horizontal. This is a more convenient telltale than the necessity of reading pointer movement from a position such as that shown in Fig. 3.

In Fig. 6, pointers 43 and 44 are inter-geared in the ratio of ten to one. Each individually indicates 940 feet altitude with the pointer 43 horizontal, so that an upward movement of pointer 43 indicates a rise of the plane above, and a downward movement of this pointer indicates a downward deviation from the same indication for level flight.

*Position No. 1—Gear movement*

A clockwise rotation of knob 53, assuming the aneroid indication to be as shown in Fig. 3, is imparted until either the reference marker 36 indicates the desired reference condition or the rotatable reference element 27 indicates the desired reference condition. The gear functioning to effect this setting is as follows: Gear 20 is held fast by any suitable provision such as friction. Counter-clockwise rotation is imparted to gears 16 and 24. Gear 25, fixed to gear 24, rotates counter-clockwise and imparts clockwise rotation to gears 28 and 29 and 42. Gear 29 imparts counter-clockwise rotation to gear 31 and gear 31, in mesh with gear 26, imparts clockwise rotation thereto. The gear ratio of the train and the numeral marking are designed to transform feet altitude into barometric pressure in inches of mercury for rotary reference element 27, and one twentieth of foot altitude indication for reference marker 36 relatively to the angular movement of pointer 43.

The clockwise rotation of gear 42 meshing with internal gear 35 imparts clockwise rotation to gear 35 and the reference marker 36 carried thereby. The gear train operating reference marker 36 is designed to impart the same angular movement to reference marker 36 as that imparted to gear 16 but in the opposite direction. The counter-clockwise rotation of gear 16 carries the entire aneroid means 11 in a counter-clockwise rotation so that the pointer moves negatively the same angular amount that the reference marker 36 moves positively, and by reason of the stationary positioning of gear 20, including the planetary mounting for the ten to one gear train 47, 48, 49, 50 operating pointer 44 from spindle 45, a commensurate ten to one reduced negative movement is imparted to pointer 44 in perfect synchronized accuracy. At the same time that the setting adjustment is being made, there is no interference with the operative functioning of the aneroid means 11 upon the pointers 43 and 44 through the spindle 45.

*Position No. 2—Gear functioning*

By reason of the fact that the pinion 54 simultaneously engages the teeth of gears 16, 24, and 20, no movement of gear 42 on its shaft 30 is possible, so that it serves as a fixed gripper for internal gear 35, causing internal gear 35 with its reference marker 36, as well as the aneroid means, pointers and scales, and, in fact, all the indicating means, to move as an entirety from the position shown in Fig. 3, for example, into the position shown in Fig. 5. This setting movement is effected also without interfering, during its progress or after its completion, with the operative functioning of aneroid means 11.

*Position No. 3—Gear functioning*

In Position No. 3, pinion 54 engages solely gears 24 and 20, gear 16 with the rest of the aneroid means being suitably held in fixed position as by frictional engagement with the stationary casing 12.

Gears 24 and 20, being relatively non-rotatable by reason of the simultaneous engagement of their teeth by pinion 54, prevent any rotation of gears 28, 29, and 42 about their axis 30, although they do revolve about the major axis passing through spindle 45 in the angular amount that rotation is imparted to gears 24 and 20. Pinion 29 holds gear 31 against rotation on its axis, although it revolves about the central axis and acts as a gripper for gear 26 carrying the reference element 27. Likewise, the non-rotating gear 42 serves as a gripper for the internal gear 35 carrying reference marker 36. An adjusting setting movement is therefore imparted to reference elements 27 and 36 and dial 32.

In addition, the rotation of the planetary mounting 22, 23 carrying the shaft of gears 48 and 49 imparts an adjusting movement to pointer 44 relatively to pointer 43, then stationary by reason of the fact that the aneroid means 11 with its spindle 45 is then stationary, provided the ratio of gear 47 to gear 48 is unequal to the ratio of gear 50 to the pinion 49. Obviously, if such ratios are identical, the planet gears would roll about the two sun gears 47 and 50 without causing any relative rotation between the gear 50 and the gear 47. Such, however, is not the case and the corrective adjustment is effectable by reason of this planetary gear arrangement. This adjusting movement may be effected in either angular direction to impart a relative corrective setting for the elements of the indicating means just enumerated.

*Position No. 4—Gear functioning*

It is assumed that the indication of the altimeter is the same as that described for Position No. 1 gear movement, namely, as is shown in Fig. 3, indicating an elevation above sea level of 1,340 feet, and that it is desired to set the altimeter for landing upon a landing field with an elevation of 400 feet above sea level so as to obtain an indication like that shown in Fig. 4.

To effect this setting of the altimeter as was described in connection with Position No. 1, a clockwise rotation was imparted to the finger knob 53. For accomplishing it in this other way, namely that of Position No. 4, a counter-clockwise rotation is imparted to knob 53 and in consequence, a counter-clockwise rotation of pinion 54 results. The counter-clockwise rotation of pinion 54 causes a clockwise rotation of gear 20, now functioning as a planetary journaling for the multiple gear unit 28, 29, and 42 on the same shaft 30, large gears 16 and 24 being held stationary in a suitable manner by reason of their frictional engagement with the stationary casing 12 at the portion 19. Gear 28 functioning as a planet gear about central axis 45 and in toothed engagement with the then stationary gear 25 is caused to rotate about its axis 30 in a clockwise direction, and also gears 29 and 42 forming a unit with gear 28. Gear 29 in mesh with gear 31 drives gear 31 counter-clockwise. Gear 31 rotating counter-clockwise in turn drives gear 26 clockwise, and gear 26, carrying the rotary reference member 27, imparts a clockwise setting adjusting movement to the rotary member 27. During this rotation of the reference member 27 clockwise, the pointer 43 has remained stationary relatively to casing 12 by reason of the fixed stationary positioning of the aneroid means 11 but dial 32 with its scale 37 has been rotated clockwise relatively to casing 12, just the angular amount that gear 20 has been rotated, by reason of the fact that it is secured on the hub 22, 23 of this gear 20. However, this clockwise rotation of the dial 32 does not interfere with the setting of the reference marker 36 on scale 37 of dial 32 so as to indicate the 400 foot elevation of the landing field, by reason of the fact that the reference marker 36 is caused by this sun and planet arrangement to travel angularly at twice the angular rate relatively to casing 12 of the rate at which the dial 32 is rotated and likewise clockwise. The proper setting is indicated on the instrument as soon as the reference marker 36 coincides with the major marking 40 of scale 37, although for this second method of setting, the scale indication 4 no longer occupies the position shown in Fig. 4, but has traveled around to the angular position indicated in Fig. 4 by the position of the mark 8 and the zero of scale 37 has been caused to occupy the position of the mark 4 as shown in Fig. 4. By this functioning, the negative setting of the pointer 43 relatively to the scale 37 is accomplished by moving the scale 37 negatively relatively to the stationary pointer 43 instead of moving the pointer 43 negatively with relation to the scale. This setting adjustment in accordance with Position No. 4 not only fixes the position of the reference marker but has caused the pointer 43 to indicate 940 on scale 37.

The clockwise rotation of rotary reference member 27 has now caused a numerical indication of the barometric pressure corresponding to the 400 foot altitude of the landing field to be displayed through window 33. It is to be understood, therefore, that this No. 4 position setting can be effected by rotating the knob 53 counter-clockwise until the proper barometric pressure corresponding to that at the landing field is indicated through the window 33, provided it is barometric pressure that was obtained as by telephone communication with the landing field instead of foot altitude. Foot altitude makes it convenient to adjust the reference marker 36, whereas barometric pressure at the landing field makes it convenient to set by means of the numeral bearing reference marker 27 shown through window 33.

So far, there has been described the proper relative setting between scale 37, pointer 43, reference marker 36, and reference marker 27. An advantage of this invention in connection with pointer 44 is also present.

The rotation of gear 20 clockwise the equivalent of four major divisions on dial 32 revolves the common planet shaft of gears 48 and 49 clockwise an equal angular amount. By reason of the ten to one ratio in the gear train 47, 48, 49, and 50, this sun and planet functioning effects a counter-clockwise rotation of the short pointer 44 one-tenth of the relative rotation between dial 32 and the long stationary pointer 43, so as to cause it to indicate the nine-tenths or less than unit indication on scale 37. Thus it is to be seen that both pointers 43 and 44 indicate relatively to the scale 37 by reason of this No. 4 position adjustment exactly as they indicate relatively to the scale 37 in Fig. 4. Now, if desired, the knob 53 may be manipulated in Position No. 2 to rotate the entire indicating apparatus and aneroid so as to cause an indication exactly as is shown in Fig. 4.

There has now been described the complete functioning through the medium of Position No. 4 to effect a setting as is indicated in Fig. 4. Obviously, such could not be the case if the shaft for gears 48 and 49 was fixed relatively to the casing 12 or relatively to the aneroid means 11. For the ten to one ratio between pointers 43 and 44, gear 48 divided by gear 47 times gear 50 divided by gear 49 should equal ten.

This setting of the indicating and reference means by moving solely the gear 20 with gears 16 and 24 stationary is therefore the converse or reverse of the action when gears 16 and 24 are rotated and gear 20 is held stationary. Stated differently, this Position No. 4 functioning moves the dial 32 relatively to a stationary casing and a stationary pointer 43 and gives a compensating movement for the range pointer 44 and allows the aneroid means 11 to be stationary relatively to the casing 12 while the reference means 36 and 27 are properly set also.

The advantages of the invention as above outlined are best realized when all of its features and instrumentalities are combined in one and the same structure, but useful devices may be produced embodying less than the whole. It will be obvious to those skilled in the art to which this invention appertains, that the same may be incorporated in several different constructions. The embodiment shown and described herein, therefore, is submitted merely as showing a preferred exemplification of the invention. While the invention is applicable to altimeters, it is also applicable as to many of its sub-combination elements, to tachometers, and indicators for stress, flow, air speed, and the like. For example, the housing of all the parts in a single casing providing a clearly visible dial with a large peripheral scale indicating in the decimal system from a plurality of pointers, may have advantage in the construction of many indicators. The pointers 43 and 44 are shown having counter balancing extensions 43′ and 44′. This provision, in addition to the simple type of intergearing of these pointers, tends to make the entire indicator serviceable regardless of the direction and amount of gravitational force or its equivalent, combined gravitational and centrifugal force so often present in air-plane service.

It will be appreciated that various changes and modifications may be made in the device as shown in the drawings, and that the same is submitted in an illustrating and not in a limiting sense, the scope of the invention being defined in the following claim.

I claim:

An altimeter having a scale, an indicator, a plurality of pointers movable in the ratio of one to ten by the indicator, said pointers being coordinated with said scale, and the indicator and scale being rotatable relatively to each other.

PAUL KOLLSMAN.